United States Patent
Zhang

(10) Patent No.: US 6,932,073 B2
(45) Date of Patent: Aug. 23, 2005

(54) POWER TOOL WORK TABLE

(76) Inventor: Charlie Zhang, 425 Luthin Rd., Oak Brook, IL (US) 60523

( * ) Notice: Subject to any disclaimer, the term of this patent is extended or adjusted under 35 U.S.C. 154(b) by 193 days.

(21) Appl. No.: 10/625,180

(22) Filed: Jul. 23, 2003

(65) Prior Publication Data

US 2005/0016631 A1 Jan. 27, 2005

(51) Int. Cl.⁷ ................................................ B28D 1/04
(52) U.S. Cl. ...................... 125/13.01; 125/35; 451/411; 451/449; 451/361
(58) Field of Search ................................ 451/411, 449, 451/450, 360, 361, 488, 454; 125/13.01, 35

(56) References Cited

U.S. PATENT DOCUMENTS

| | | | |
|---|---|---|---|
| 3,634,975 A | * | 1/1972 | Hensley ...................... 451/127 |
| 4,991,354 A | * | 2/1991 | Schweickhardt ............ 451/188 |
| 6,080,041 A | * | 6/2000 | Greenland .................... 451/11 |
| 6,439,218 B1 | * | 8/2002 | Hulett ....................... 125/13.01 |
| 6,632,126 B1 | * | 10/2003 | Cogswell .................... 451/178 |
| 6,672,188 B2 | * | 1/2004 | Lee ............................. 83/168 |
| 6,679,244 B1 | * | 1/2004 | Tsao ........................ 125/13.01 |

* cited by examiner

Primary Examiner—Eileen P. Morgan
(74) Attorney, Agent, or Firm—Pauley Petersen & Erickson

(57) ABSTRACT

A work table includes a work surface having two generally parallel bars extending across and above the work surface. Two sleeves are slidably connected to the two generally parallel bars, each sleeve of the two sleeves positioned around each bar of the two generally parallel bars. A power tool, such as a tile saw is connected between the two sleeves and thereby slides along the two bars. A channel is preferably positioned across the work surface and includes water or similar coolant/lubricant for the power tool. Handles are additionally positioned in the side of the work surface and are moveable between a retracted position within the work surface and an extended position away from the work surface. In the extended position, the handle includes a top edge generally flush with the work surface.

26 Claims, 4 Drawing Sheets

POWER TOOL WORK TABLE

BACKGROUND OF THE INVENTION

1. Field of the Invention

This invention relates to a work table for using a power tool, such as a tile saw.

2. Description of Related Art

Work tables are useful on job sites requiring portable work surfaces for cutting, machining and otherwise processing construction materials. Existing work tables are typically limited in size by weight and portability considerations.

One example of existing work tables are tables having an overhead bar under which a power tool travels to effect a straight path for cutting, grinding, etc. This arrangement results in a heavy table with a limited cutting path.

SUMMARY OF THE INVENTION

It is one object of this invention to provide a work table that is lightweight and portable yet still includes a significant work surface.

It is another object of this invention to provide a work table that can provide a steady supply of water or similar coolant to a power tool.

It is yet another object of this invention to provide a work table that has a compact footprint yet provides an expansive work surface.

A work table according to a preferred embodiment of this invention preferably includes a planar member having a generally flat work surface and an opposed lower surface. The work surface is preferably configured to accommodate materials for cutting, grinding, sanding, etc.

Two generally parallel bars extend across a length of the work surface. Each bar includes a sleeve slidably connected around the bar. The sleeves are preferably aligned with respect to each other along the bars.

A power tool and/or a mounting bracket is preferably connected between the two sleeves. The mounting bracket may be a universal bracket that includes hardware for securing the power tool. Alternatively, the power tool may be permanently or removably affixed between the two sleeves.

A pair of handles are preferably positioned one in each side of the planar member. The handles are preferably moveable between a retracted position within the planar member and an extended position away from the planar member. The handles preferably extend along telescoping rods. In the extended position, the handle and the rods includes top edges that are generally flush with the work surface. As a result of this arrangement, the work table includes additional function work area facilitating support of large workpieces, such as tile or lumber.

In addition, the work table includes a channel extending into the work surface between the two generally parallel bars. The channel is preferably filled with water or similar coolant/liquid and accommodates a blade or other element of the power tool. The work table preferably further includes a reservoir positioned along the lower surface in fluid communication with the channel. The reservoir is preferably machined into the lower surface or removably attached to the lower surface and accommodates an additional supply of water or similar coolant/liquid thereby providing the channel with additional water.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

FIGS. 1–5 show a work table according to a preferred embodiment of this invention.

Work table preferably includes planar member 20 having a generally flat work surface 25 and an opposed lower surface 30. Work surface 25 is preferably configured to accommodate materials for cutting, grinding, sanding, etc. As such, work surface 25 may include an integrated grid spaced at desired units of measure.

Figure 1:
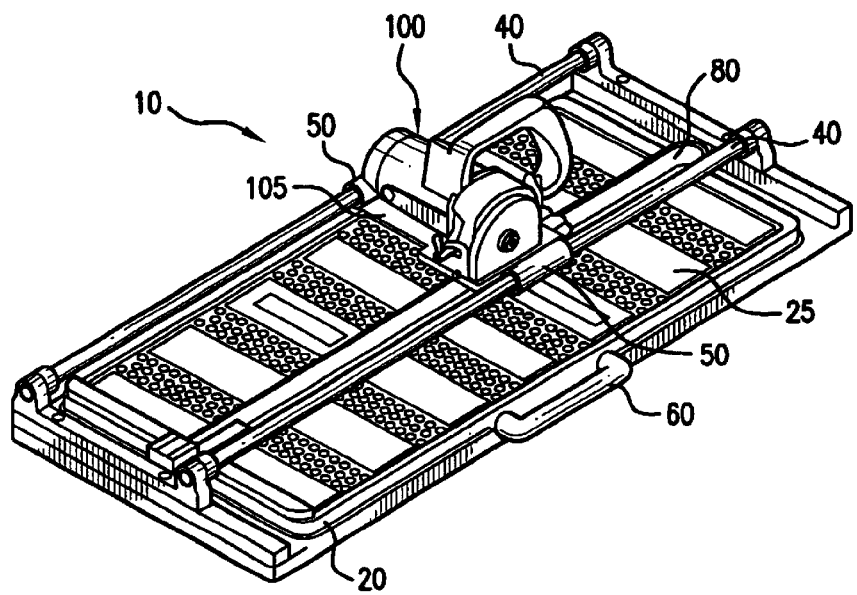
FIG. 1 is a top perspective view of a work table wherein a pair of handles are in a retracted position according to one preferred embodiment of this invention.
Figure 2:
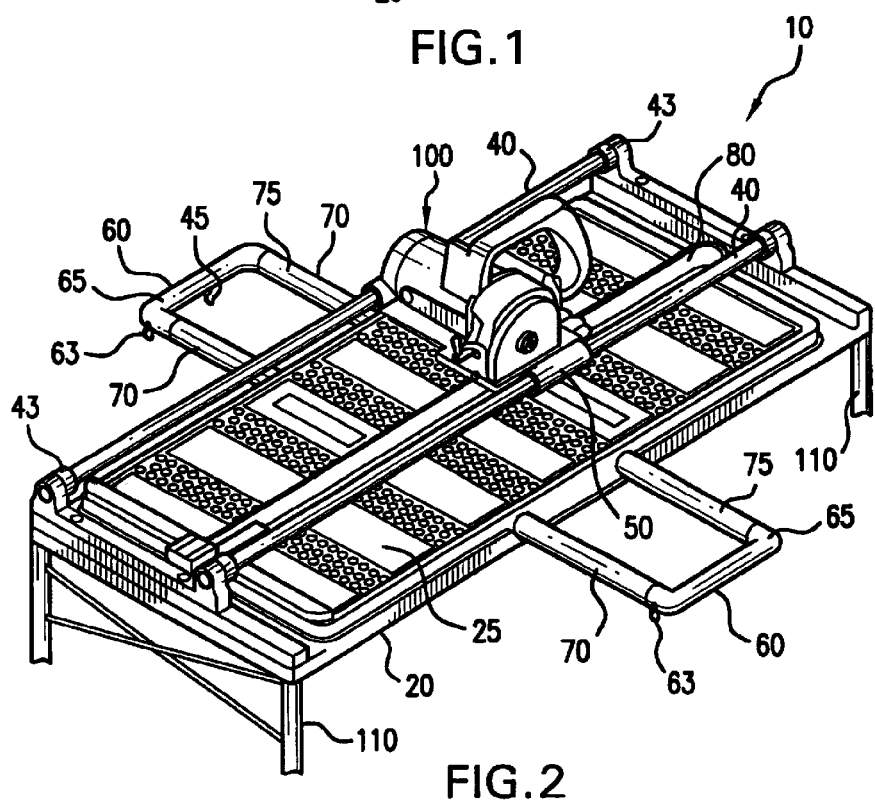
FIG. 2 is a top perspective view of the work table shown in FIG. 1 wherein a pair of handles are in an extended position according to one preferred embodiment of this invention.

As shown in FIGS. 1 and 2, two generally parallel bars 40 extend across work surface 25. According to a preferred embodiment of this invention bars 40 are constructed of aluminum or similar strong, lightweight material. Bars 40 preferably extend longitudinally across work surface 25 and preferably include bumpers 43 at each end to dampen impact of a power tool against each end of bar 40.

Further, work table 10 preferably includes sleeve 50 slidably connected around each bar 40. Sleeves 50 preferably comprise a bushing, a bearing or similar arrangement that permits free and uniform motion across the two generally parallel bars 40. Sleeves 50 are preferably aligned with respect to each other along bars 40.

Power tool 100 and/or mounting bracket 105 is connected between the two sleeves 50. Mounting bracket 105 may be a universal bracket that includes hardware for securing power tool 100. Alternatively, power tool 100 may be permanently or removably affixed between the two sleeves 50 so that power tool 100 slides along bars 40 in a fluid, linear path across work surface 25.

As shown in FIGS. 1 and 2, handle 60 is positioned in a side of planar member 20. More specifically, handle 60 is positioned in each side of planar member 20 such that each handle 60 is extendible perpendicular from planar member 20. Handle 60 is thus moveable between a retracted position within planar member 20 and an extended position away from planar member 20. Handle 60 preferably includes fastener 63 or similar device for maintaining handle 60 in the retracted position. Alternatively, telescoping rods 70 may include a detente or other stop to prevent extension of telescoping rods 70 without an additional force applied to handle 60.

In the extended position, handle 60 includes top edge 65 that is generally flush with work surface 25. In addition, one or more telescoping rods 70 preferably connect handle 60 to planar member 20. Accordingly, each telescoping rod 70 includes top edge 75 that is generally flush with work surface 25 and top edge 65 of handle 60. As partially shown in FIG. 3, telescoping rods 70 may slide through apertures 78 machined into lower surface 30 of planar member 20.

According to one preferred embodiment of this invention, in the extended position, each handle 60 is spaced at least approximately 20% of a width of work surface 25 away from work surface 25. As such, at least approximately 40% work area is added to work surface 25 by virtue of the extended handles 60. This additional work area facilitates support of large workpieces, such as tile or lumber, that require cutting or other working by power tool 100.

Handle 60 is preferably rigidly fixed in a position generally co-planar with work surface 25 and is not hinged to a side of planar member 20. Such arrangement enables handle 60 to support workpieces on work table 10 and adds to the usable work area on work table 10.

According to one preferred embodiment of this invention, latch 45 is positioned on a side of work surface 25 and is attachable to one sleeve 50. Latch 45, when in a latched position, thereby prevents movement of sleeve 50 relative to bar 40 and thus prevents movement of power tool 100 when work table 10 is in transit. According to one preferred embodiment of this invention, latch 45 extends from handle 60 or from nearby handle 60 thereby concentrating weight of power tool 100 immediately below handle 60 to optimize the dynamics of moving work table 10. According to one preferred embodiment of this invention, latch 45 and fastener 63 may be the same assembly or operate in concert with each other.

FIGS. 1 and 2 further show one embodiment of the subject invention having channel 80 extending into work surface 25 between the two generally parallel bars 40. Channel 80 is preferably filled with water or similar coolant/liquid and accommodates a blade or other element of power tool 100. For instance, in an arrangement of work table 10 used in connection with a tile saw, the tile saw includes a blade that extends into channel 80 and thus water, thereby maintaining an effective cut across each piece of tile.

Figure 3:
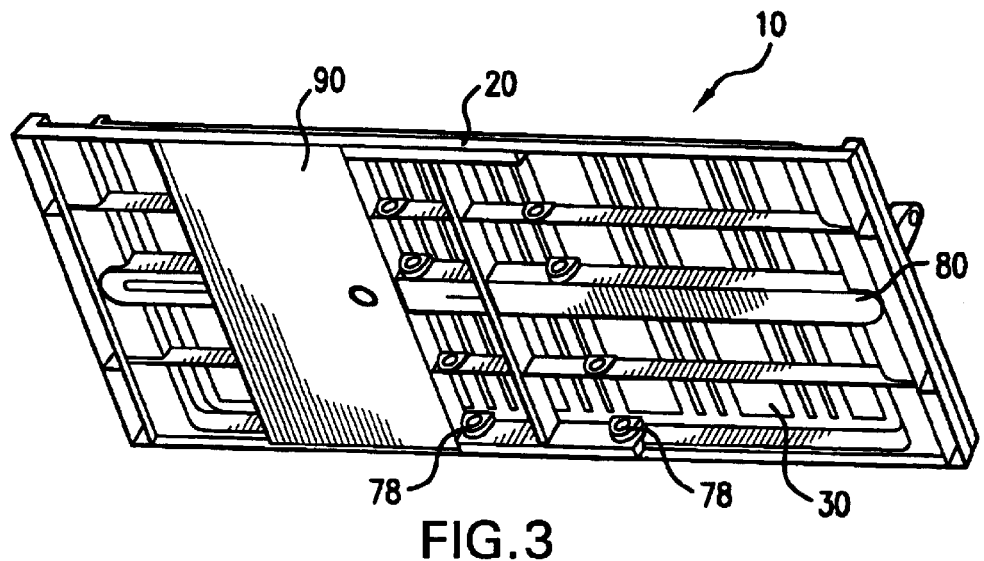
FIG. 3 is a bottom perspective view of the work table shown in FIG. 1 according to one preferred embodiment of this invention.
Figure 4:
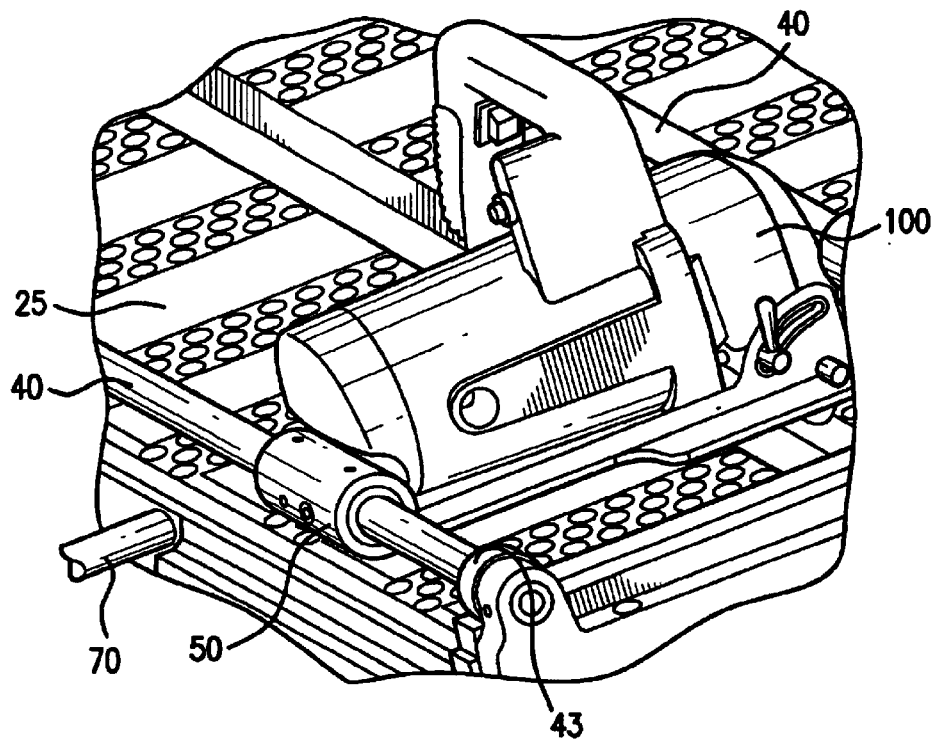
FIG. 4 is a front perspective view of a power tool on a work table according to one preferred embodiment of this invention.

According to one preferred embodiment of this invention best shown in FIG. 3, reservoir 90 is positioned along lower surface 30 beneath work surface 25 and in fluid communication with channel 80. Reservoir 90 is preferably machined into lower surface 30 or removably attached to lower surface 30 to facilitating cleaning and/or adjustment and/or replacement. Reservoir 90 accommodates an additional supply of water or similar coolant/liquid and provides channel 80 with additional water should power tool 100 use an existing supply within channel 80 during operation. According to one preferred embodiment of this invention, reservoir 90 is positioned perpendicular to channel 80 such that reservoir 90 overlaps a length of channel 80 thereby providing channel 80 with an adequate reserve of coolant/liquid. As such, reservoir 90 extends across a width of lower surface 30.

According to one preferred embodiment of this invention, reservoir 90 may be closed or otherwise sealed to enable transit of work table 10 without spilling water or other coolant/fluid. Reservoir 90 may be removed and sealed or otherwise sealed while in position along lower surface 30 of work table 10.

According to one preferred embodiment of this invention, work table 10 includes folding legs 110 positioned along lower surface 30 opposite work surface 25. Legs 110 are preferably lightweight and foldable and provide adequate support for typical loads to be encountered on work table 10.

Figure 5:
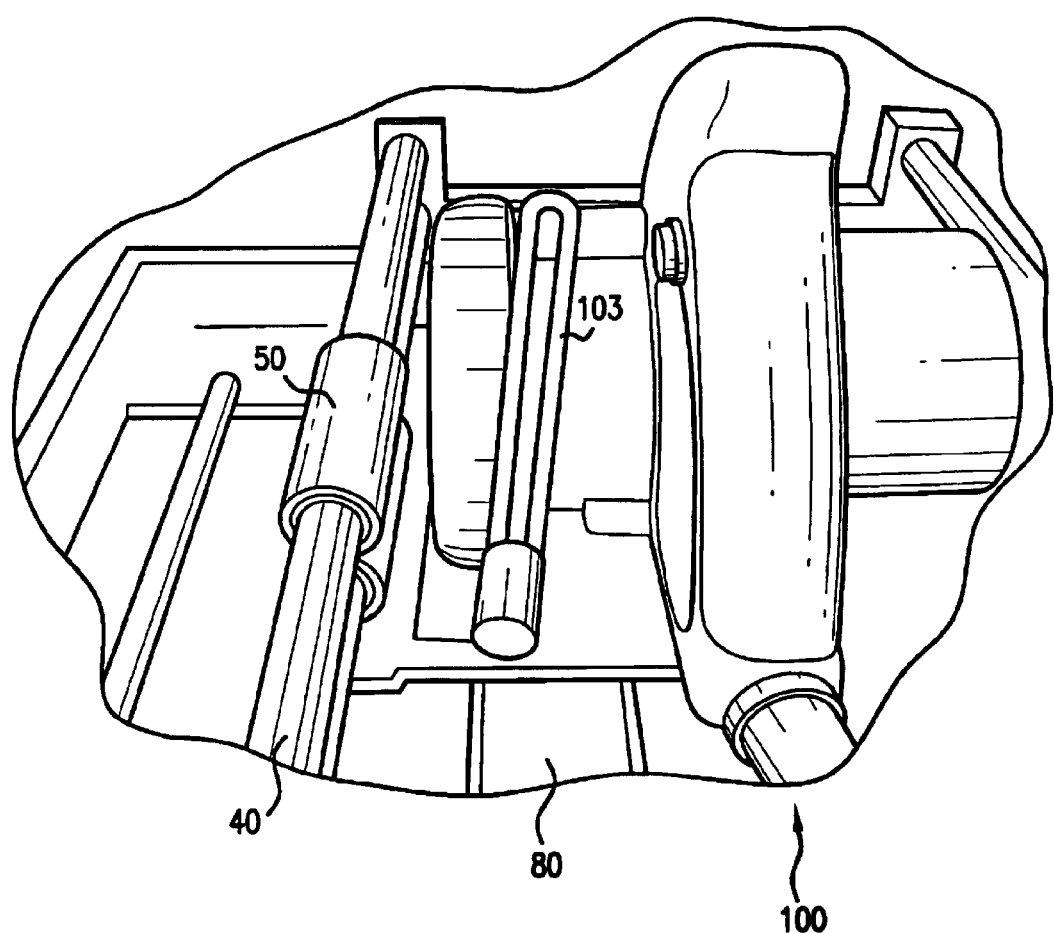
FIG. 5 is a back perspective view of a power tool on a work table according to one preferred embodiment of this invention.

In a preferred embodiment of this invention, work table 10 is used in connection with a tile saw. The tile saw preferably includes a blade extending into the channel. Large pieces of tile are accommodated by work table 10 when handles 60 are in the extended position. Power tool 100 may alternatively be a profile wheel, stone saw, circular saw, edge grinder or similar tool that requires a sufficient work surface 25. As shown in FIG. 5, power tool 100 may be a tile saw having an adjustable saw guide 103 with a slot that follows a contour of the tile saw motor.

Figure 6:
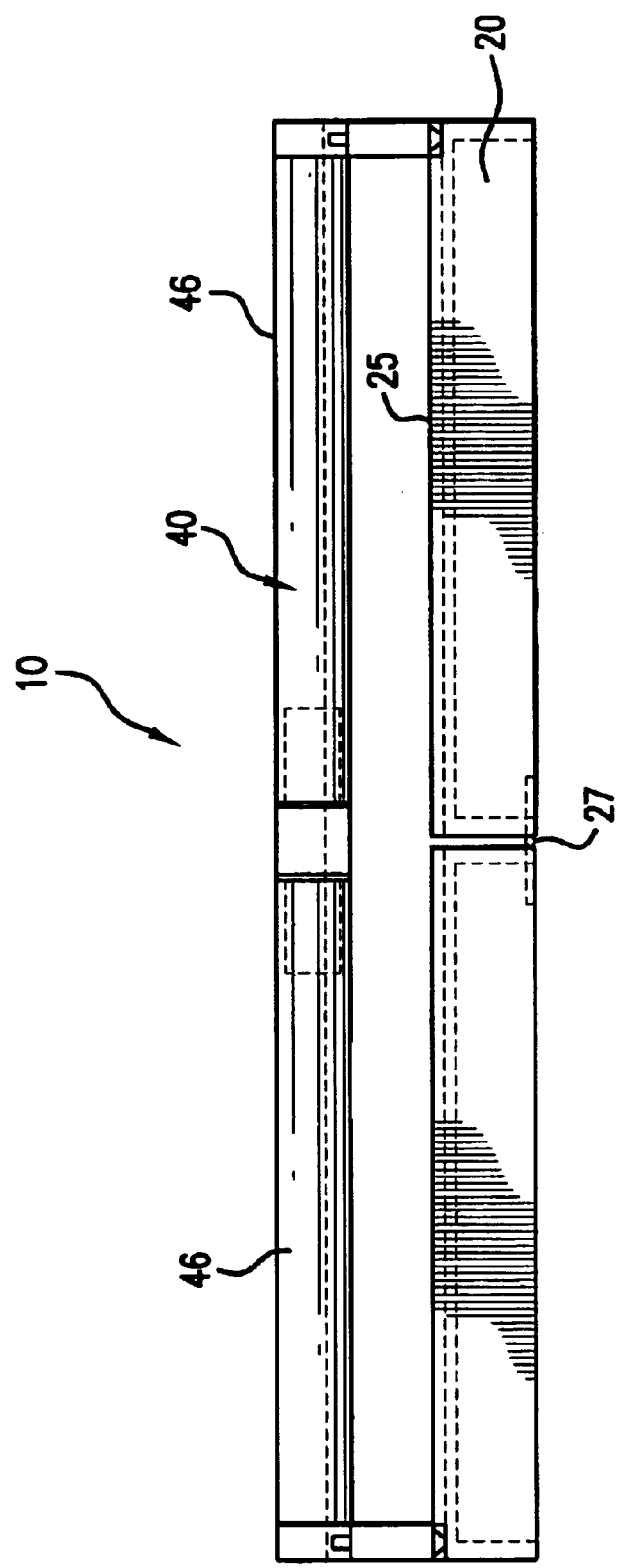
FIG. 6 is a side view of a work table according to one preferred embodiment of this invention.

FIG. 6 shows an additional preferred embodiment of the subject invention wherein bars 40 are collapsible into two or more pieces 46. In addition, work surface 25 may include hinge 27 to fold work table 10 in half. Preferably, work table 10 when folded may accommodate the two or more pieces 46 of bars 40 so that work table 10 is compact and portable to and from a job site.

While in the foregoing specification this invention has been described in relation to certain preferred embodiments thereof, and many details have been set forth for purpose of illustration, it will be apparent to those skilled in the art that the work table according to this invention is susceptible to additional embodiments and that certain of the details described herein can be varied considerably without departing from the basic principles of the invention.

I claim:

1. A work table comprising:
   a work surface;
   two generally parallel bars extending across the work surface;
   two sleeves slidably connected to the two generally parallel bars, each sleeve of the two sleeves positioned around each bar of the two generally parallel bars;
   a power tool connected between the two sleeves;
   a handle positioned in the side of the work surface, the handle moveable between a retracted position within the work surface and an extended position away from the work surface, in the extended position the handle having a top edge generally flush with the work surface.

2. The work table of claim 1 further comprising:
   a telescoping rod connecting the handle to the work surface, the telescoping rod having a top edge generally flush with the work surface and the top edge of the handle.

3. The work table of claim 1 further comprising:
   a channel extending into the work surface between the two generally parallel bars.

4. The work table of claim 3 further comprising:
   a reservoir positioned beneath the work surface and in fluid communication with the channel.

5. The work table of claim 1 further comprising:
   folding legs positioned below the work surface.

6. The work table of claim 1 wherein the power tool comprises a tile saw, the tile saw having a blade extending into the channel.

7. The work table of claim 1 further comprising:
   a channel extending into the work surface between the two generally parallel bars; and
   a reservoir positioned beneath the work surface and perpendicular to the channel, the reservoir in fluid communication with the channel.

8. The work table of claim 1 wherein, in the extended position, the handle is spaced at least approximately 20% of a width of the work surface away from the work surface.

9. The work table of claim 1 further comprising:
   two handles, each handle positioned within a side of the work surface.

10. The work table of claim 1 wherein the two generally parallel bars are collapsible into two or more pieces.

11. The work table of claim 1 wherein the work surface is hinged across a middle portion to fold in half.

12. A tile saw table comprising:
   a work surface;
   two generally parallel bars extending across the work surface;
   two sleeves slidably connected to the two generally parallel bars, each sleeve of the two sleeves positioned around each bar of the two generally parallel bars;
   a channel extending into the work surface and between the two generally parallel bars;
   a reservoir positioned below the work surface and in fluid communication with the channel;
   a tile saw connected between the two sleeves, the tile saw having a blade extending into the channel and further comprising a handle positioned in a side of the work surface, the handle moveable between a retracted position within the work surface and an extended position away from the work surface, wherein in the extended position the handle having a top edge generally flush with the work surface.

13. The tile saw table of claim 12 wherein, in the extended position, the handle is spaced at least approximately 20% of a width of the work surface away from the work surface.

14. The tile saw table of claim 12 further comprising:
   two handles, each handle positioned within a side of the work surface.

15. The tile saw table of claim 12 wherein the handle is rigidly fixed in a position generally co-planar with the work surface.

16. The tile saw table of claim 12 further comprising:
   a latch positioned on a side of the work surface, the latch attachable to one sleeve of the two sleeves.

17. The work table of claim 12 wherein the two generally parallel bars are collapsible into two or more pieces.

18. The work table of claim 17 wherein the work surface is hinged across a middle portion to fold in half, wherein the folded work table contains the two or more pieces of the two generally parallel bars.

19. A work table comprising:
   a planar member having a work surface and an opposed lower surface;
   two generally parallel bars extending across the work surface;
   two sleeves slidably connected to the two generally parallel bars, each sleeve of the two sleeves positioned around each bar of the two generally parallel bars;
   a channel extending into the work surface and between the two generally parallel bars;
   a reservoir positioned along the lower surface and in fluid communication with the channel;
   a power tool connected between the two sleeves, a portion of the power tool extending into the channel; and
   a pair of handles positioned on each side of the planar member, each handle moveable between a retracted position within the planar member and an extended position away from the planar member, in the extended position the handle having a top edge generally flush with the work surface.

20. The work table of claim 19 wherein each handle telescopes to the extended position along a pair of rods, the rods and the handle forming a generally planar surface with the work surface.

21. The work table of claim 20 wherein, the extended position, the rods add at least approximately 20% of width to each side of the work surface.

22. The work table of claim 19 wherein each handle is rigidly fixed in a horizontal position generally co-planar with the work surface.

23. The work table of claim 19 wherein the power tool comprises a saw and the portion of the saw extending into the channel comprises a saw blade.

24. The work table of claim 19 wherein the reservoir extends across a width of the lower surface.

25. The work table of claim 19 further comprising:
   a latch positioned on a side of the planar member, the latch attachable to one sleeve of the two sleeves.

26. A work table having a generally planar work surface, the work table comprising:
   two generally parallel bars extending across the work surface;
   a channel extending into the work surface between the two generally parallel bars, the channel filled with a cutting fluid;
   a power tool having a blade, the power tool slideable across the two generally parallel bars so that the blade extends into the cutting fluid within the channel as the power tool slides across the two generally parallel bars and further comprising a handle positioned in a side of the work surface, the handle moveable between a retracted position within the work surface and an extended position away from the work surface, wherein in the extended position the handle having a top edge generally flush with the work surface.

* * * * *